Jan. 2, 1934.   K. E. McCONNAUGHAY   1,941,808
EMULSIFIER
Filed Dec. 8, 1930

Inventor
KENNETH E. McCONNAUGHAY,
By
Attorneys

Patented Jan. 2, 1934

1,941,808

UNITED STATES PATENT OFFICE 1,941,808

EMULSIFIER

Kenneth E. McConnaughay, Indianapolis, Ind.,
assignor to Pre Cote Corporation, Indianapolis,
Ind., a corporation of Indiana Application December 8, 1930. Serial No. 500,830

9 Claims. (Cl. 259—9)

It is the object of my invention to produce an emulsifier particularly suitable for the continuous preparation of bitumen emulsions such as are employed in the production of paving material. Further, it is my object to produce an emulsifier of simple construction and light weight in order that it can conveniently be transported and set up for use in any desired location.

My emulsifier is in the form of a hollow chamber having spaced inlet and discharge openings and provided interiorly with a plurality of relatively movable vanes or blades which, as the ingredients of the emulsion pass through the chamber, thoroughly agitate and intermix such ingredients. These relatively movable vanes or blades are desirably out of contact with each other so that the ingredients of the emulsion are not subjected to any grinding or rubbing action such as takes place in colloid mills frequently used in the production of bitumen emulsion.

Desirably, the proportions of the ingredients of the emulsion are controlled by flow-meters located in the pipes through which the emulsion-ingredients are introduced to the mixing chamber. This enables the proportions to be controlled with considerable accuracy and results in a continuous process. By the use of this process and by the use of an emulsifier constructed in accordance with my invention, I have found that a small and readily portable emulsifying plant can be made which will be capable of producing 30 to 40 thousand gallons of the emulsion per day.

Figure 1:
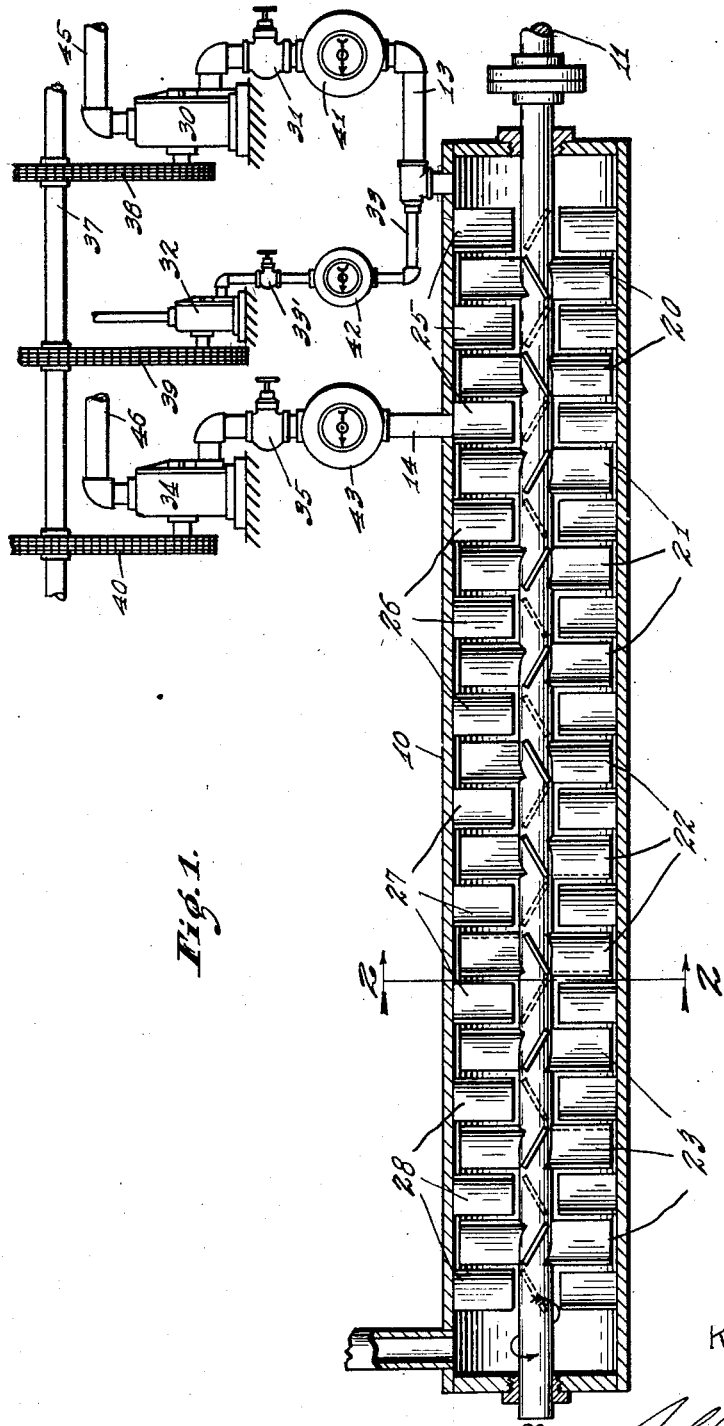
Figure 2:
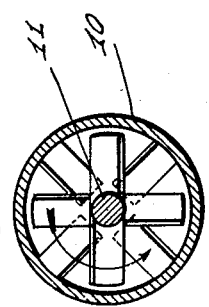

The accompanying drawing illustrates my improved emulsifier: Fig. 1 is a longitudinal section through the emulsifier showing the inlet pipes through which the ingredients are introduced and the discharge pipe through which the emulsion is forced to the point of use; and Fig. 2 is a transverse section on the line 2—2 of Fig. 1 illustrating the arrangement of the relatively movable blades.

In this application, the emulsifier is described as used in the process of emulsion production set forth and described in my co-pending application Serial No. 503,494, filed Dec. 19, 1930, although it is otherwise useable. In the process of that application, the bitumen is melted and the saponifiable ingredient of an emulsifying soap is mixed with it. These ingredients are then mixed with the water in which the proper amount of alkali has been dissolved, and the mixture is thoroughly agitated by stirring to produce an emulsion.

The emulsifying chamber is conveniently a hollow cylindrical body 10 through the center of which there passes a rotatable shaft 11 adapted to be driven by any convenient means. At one end, the chamber 10 is connected to a discharge pipe 12 through which the emulsion is discharged and at the other end with an inlet pipe 13 through which emulsion ingredients are introduced into the chamber 10. If, as contemplated in my aforesaid copending application, certain of the emulsion ingredients are to be subjected to a preliminary mixing, the pipe 13 may be one of two inlet pipes and conveys to the chamber 10 those ingredients which are to be preliminarily mixed. The other inlet pipe 14 introduces the remaining ingredients of the emulsion into the chamber 10 at a point spaced longitudinally from the point at which the pipe 13 enters the chamber.

Within the chamber 10, the shaft 11 is provided with a plurality of agitating blades which are disposed at an angle to the axis of the shaft 11 in order to tend to move the liquid in the chamber 10 axially thereof as the shaft 11 rotates. Desirably, these blades are arranged in sets in such a manner that blade-sets tending to force the liquid toward the discharge end of the casing alternate with blade-sets tending to force the liquid in the opposite direction. Each set of blades comprises a plurality of groups, the blades of each group being located in substantially the same transverse plane, and the different groups of each set being spaced apart axially of the shaft.

Thus, the shaft is shown as being provided near the inlet end of the casing with two groups of blades 20 which, as they revolve, tend to move the liquid in the chamber in a direction opposite to its normal direction of flow from the supply pipe 13 to the discharge pipe 12. The next set of blades comprises three groups 21 the inclination of which is opposite to that of the blades 20; and the blades 21, therefore tend as they revolve to move the liquid in the casing toward the discharge end thereof.

Following the set of blade-groups 21, there is another set of three blade-groups 22 of the blades of which are inclined similarly to the blades 20, and, like the blades 20, tend to force liquid in the chamber toward the inlet end thereof. The blades of the last set of rotating blade-groups 23 are disposed oppositely to the blades 22 and therefore tend to force liquid toward the discharge opening and through the pipe 12.

The chamber 10 is provided interiorly with a plurality of sets of stationary blade-groups interspersed between the blade-groups mounted on the shaft 11. Like the sets of blade-groups on the shaft 11, the blades of each stationary set of blade-groups are inclined, and desirably inclined in such a direction as to oppose the tendency of an adjacent rotating blade-group to move the liquid axially of the mixing chamber. Thus, the drawing illustrates a set of three blade-groups 25 which are located near the inlet end of the chamber and arranged alternately with the movable blade-groups 20, the blades of the groups 25 being so inclined that the liquid, which has a circular motion imparted to it by the effect of the rotating blades 20, is directed, upon striking the blades 25, toward the discharge end of the chamber 10. Next following the set of blade-groups 25 is a set of three stationary blade-groups 26 the blades of which are inclined oppositely to the blades 25 and tend by their reaction on the whirling liquid to move it toward the inlet opening. The next set of stationary blade-groups 27 contains blades of the same inclination as the blades 25; and the blades 27, therefore, act on the liquid tending to force it toward the discharge end of the casing 10. The blades of the last set of blade-groups 28 are oppositely inclined and their action on the liquid tends to oppose its movement toward the discharge outlet of the casing.

It will be apparent that with the blade-arrangement above specified the liquid within the casing 10 will be subjected to a very thorough agitation as the shaft 11 revolves and as the liquid passes through the casing toward the opening into the discharge pipe 12. Each set of rotating blades tends to cause the liquid to revolve and also to move axially of the casing. Both these tendencies are opposed by the adjacent groups of stationary blades. Thus, the rotating blades 20 tend by reason of their inclination to move the liquid toward the inlet end of the casing 10 and to impart a circular motion to it. When the liquid thus moved comes into contact with the stationary blades 25, its tendency to rotate is opposed; and the blades 25, by reason of the direction of their inclination, tend to cause the liquid to move toward the discharge end of the casing 10. Similarly, the stationary sets of blade-groups 26, 27, and 28 respectively oppose the action of the rotating sets of blade-groups 21, 22, and 23.

The stationary and movable blades of the emulsifier are desirably of such width that there is an appreciable clearance between the adjacent blades. The angle at which the blades are set may vary, but I have found that excellent results are obtained by disposing the blades at approximately 15° to the axis of the shaft 11.

An emulsifier such as I have described having a casing 10 of approximately 5½ inches internal diameter and approximately 5 feet long, and having blades so proportioned that there is a clearance of ⅛ of an inch or slightly less between blades and between the end of each blade and the adjacent surface of the shaft or casing I have found to be capable of producing 3,000 to 4,000 gallons of emulsion per hour with the shaft 11 running at an approximate speed of 200 revolutions per minute.

It will be noted from the drawing that there are a plurality of groups of rotating blades 24 and a plurality of groups of stationary blades 25 between the openings through which the pipes 13 and 14 respectively discharge into the chamber 10. As a result, those ingredients introduced through the pipe 13 are thoroughly agitated and mixed before they come into contact with the remaining ingredients, which are introduced through the pipe 14. The emulsifier is therefore adapted to carry out the process of my aforesaid copending application, which contemplates that melted bitumen and a saponifiable material such as an oil or fatty acid will be thoroughly intermixed and then introduced with stirring into the water in which the proper amount of alkali has been dissolved.

For the purpose of introducing melted bitumen into the emulsifying chamber 10, I employ a pump 30 connected on its discharge side to the pipe 13 through a valve 31. The oil or fatty acid which is employed as one ingredient of the emulsifying agent is supplied through a pump 32, which also discharges into the pipe 13 through an intermediate pipe 33 in which a valve 33' is located. The water content of the emulsion is supplied to the chamber 10 through the pipe 14 by a pump 34, this pump discharging through a valve 35 into the pipe 14.

The pumps which I prefer to use for supplying the emulsion ingredients to the emulsifier are of an approximately positive-acting type, such as gear pumps, so that if they are driven at properly co-ordinated speeds and discharge respectively against constant heads, the emulsion ingredients will be supplied to the chamber 10 in the desired proportions. To this end, the three pumps 30, 32, and 34 may be operatively connected to a common drive shaft 37 through suitable power-transmission mechanisms such as the chain drives 38, 39, and 40 respectively. These chain drives have such related speed-ratios, and the pumps 30, 32, and 34 have such relative capacities, that the ingredients of the emulsion will be delivered to the emulsifier in approximately the proportions most frequently used. Variations in the proportions of ingredients may be secured by adjusting the valves 31, 33' and 35 to vary the pressures against which the pumps respectively discharge.

In order to check the operation of the pumps 30, 32, and 34, I may place flow-meters 41, 42, and 43 in the pipes 13, 33, and 14 through which the pumps respectively discharge. By controlling the valves 31, 33', and 35 in accordance with the readings of the flow-meters, the proportions of the emulsion ingredients may be accurately controlled.

Bitumen is supplied to the pump 30 in melted condition through a supply pipe 45 which leads from any suitable source of melted bitumen. The water supplied to the pump 34 through a water supply pipe 46 has the required amount of alkali dissolved in it and desirably is heated to a temperature of about 150° F., so that all ingredients of the emulsion reach the mixing chamber at an elevated temperature. In my co-pending application Serial No. 511,051, filed Jan. 24, 1931, I have shown means for heating the bitumen and the water and for delivering them to the respective pumps 30 and 34.

By reason of the pressure created by the pumps 30, 32, and 34, the general direction of fluid flow through the chamber 10 is toward the discharge pipe 12; but the action and interaction of the revolving and stationary blades within the chamber serve to create lateral and counter-currents, so that the ingredients are subjected to violent agitation. By reason of the presence of groups of moving and stationary blades between the points at which the pipes 13 and 14 respectively communicate with the chamber 10, the bitumen and saponifiable material are thoroughly intermixed before coming in contact with the remaining ingredients of the emulsion, which remaining ingredients are introduced through the pipe 14.

As the material within the emulsifying chamber 10 flows from the point at which the pipe 14 discharges into such chamber to the point at which the chamber communicates with the pipe 12, it is subjected to violent agitation by reason of the action of the rotating and stationary blades. This agitation results in a thorough intermixing of the ingredients and in the creation of a satisfactory emulsion which is discharged into the pipe 12 at a temperature in the neighborhood of 200° F.

It may be desirable under certain circumstances, as noted in my co-pending application Serial No. 503,494, to incorporate in the emulsion a quantity of naphtha or other solvent capable of dissolving or fluxing the bitumen. Such solvent, if it is to be incorporated, may be mixed with the fatty acid or oil supplied to the emulsifying chamber through the pump 32.

I claim as my invention:

1. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, some of said blades being disposed between said two inlet openings and inclined so as to tend to force material within the casing away from said discharge opening, and means for feeding emulsion ingredients into said casing through said inlet openings.

2. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, said rotatable and stationary blades being spaced from each other, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, some of said blades being disposed between said two inlet openings and inclined so as to tend to force material within the casing away from said discharge opening, and means for feeding emulsion ingredients into said casing through said inlet openings.

3. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, some of said rotatable blades and some of stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings and inclined so as to tend to force material within the casing away from said discharge opening, and means for feeding emulsion ingredients into said casing through said inlet openings.

4. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, said rotatable and stationary blades being spaced from each other, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings and inclined so as to tend to force material within the casing away from said discharge opening, and means for feeding emulsion ingredients into said casing through said inlet openings.

5. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces betwen said rotatable blades, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings, the rotatable blades between said two inlet openings being inclined to the shaft axis in a direction such that they tend to force material within said casing toward that inlet opening nearest the end thereof and the stationary blades between said two openings being so inclined that they tend to force such material in the opposite direction, and means for feeding emulsion ingredients into said casing through said inlet openings.

6. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, said rotatable and stationary blades being spaced from each other, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings, the rotatable blades between said two inlet openings being inclined to the shaft axis in a direction such that they tend to force material within said casing toward that inlet opening nearest the end thereof and the stationary blades between said two openings being so inclined that they tend to force such material in the opposite direction, and means for feeding emulsion ingredients into said casing through said inlet openings.

7. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings, the rotatable blades between said two inlet openings being inclined to the shaft axis in a direction such that they tend to force material within said casing toward that inlet opening nearest the end thereof, and means for feeding emulsion ingredients into said casing through said inlet openings.

8. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, said rotatable and stationary blades being spaced from each other, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings, the rotatable blades between said two inlet openings being inclined to the shaft axis in a direction such that they tend to force material within said casing toward that inlet opening nearest the end thereof, and means for feeding emulsion ingredients into said casing through said inlet openings.

9. An emulsifier, comprising a hollow cylindrical casing, a rotatable shaft extending axially through said casing, a plurality of blades mounted in axially spaced relation on said shaft for rotation therewith, a plurality of stationary blades supported from said casing and extending inwardly toward said shaft in the spaces between said rotatable blades, some of said rotatable blades and some of said stationary blades being inclined to the shaft axis in one direction and others of said rotatable and stationary blades being inclined to the shaft axis in the opposite direction, said casing being provided near one end with two axially spaced inlet openings and near the other end with a discharge opening, a plurality of stationary blades and a plurality of rotatable blades being disposed between said two inlet openings, the rotatable blades between said two inlet openings being inclined to the shaft axis in a direction such that they tend to force material within said casing toward that inlet opening nearest the end thereof and the rotatable blades near said discharge opening being inclined to the shaft axis in a direction such that they tend to force material within said casing toward said discharge opening, and means for feeding emulsion ingredients into said casing through said inlet openings.

KENNETH E. McCONNAUGHAY.